(12) United States Patent
Vanipenta et al.

(10) Patent No.: US 12,549,626 B2
(45) Date of Patent: Feb. 10, 2026

(54) METHOD AND SYSTEM FOR HIGH AVAILABILITY LOAD BALANCING OVER A REVERSE CONNECTION

(71) Applicant: Dell Products L.P., Round Rock, TX (US)

(72) Inventors: Yedukondalu Vanipenta, Singapore (SG); Emmanuel Andre, Singapore (SG); Zhi Wei Lee, Singapore (SG); Ahmad Zhafir Shaik, Singapore (SG)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/787,066

(22) Filed: Jul. 29, 2024

(65) Prior Publication Data

US 2026/0032170 A1  Jan. 29, 2026

(51) Int. Cl.
*G06F 15/16* (2006.01)
*H04L 9/40* (2022.01)
*H04L 67/1008* (2022.01)
*H04L 67/2895* (2022.01)

(52) U.S. Cl.
CPC ........ *H04L 67/1008* (2013.01); *H04L 63/029* (2013.01); *H04L 67/2895* (2013.01)

(58) Field of Classification Search
None
See application file for complete search history.

(56) References Cited

U.S. PATENT DOCUMENTS

2021/0314239 A1*  10/2021  Shen .................. H04L 63/0236

\* cited by examiner

*Primary Examiner* — Wing F Chan
*Assistant Examiner* — Andrew Woo
(74) *Attorney, Agent, or Firm* — Chamberlain, Hrdlicka, White, Williams & Aughtry; Aly Z. Dossa

(57) ABSTRACT

A method for managing workload balancing over a reverse connection includes: receiving a request from a user that wants to access a cluster to initiate performing a workload, sending a call to a proxy service; upon receiving the call: sending a message to an agent executing on a first targeted IHS in the cluster; initiating a TCP server hosted by the proxy service; making a determination that a first targeted IHS is not down; receiving, based on the determination, a response from the agent indicating that a tunnel has been established; after receiving the response from the agent, sending, a second response to the client to indicate that the tunnel is ready to use; initiating a TCP connection to the TCP server; receiving, via the TCP connection, data associated with the workload from the client; and transferring the data to the agent over the reverse connection.

20 Claims, 9 Drawing Sheets

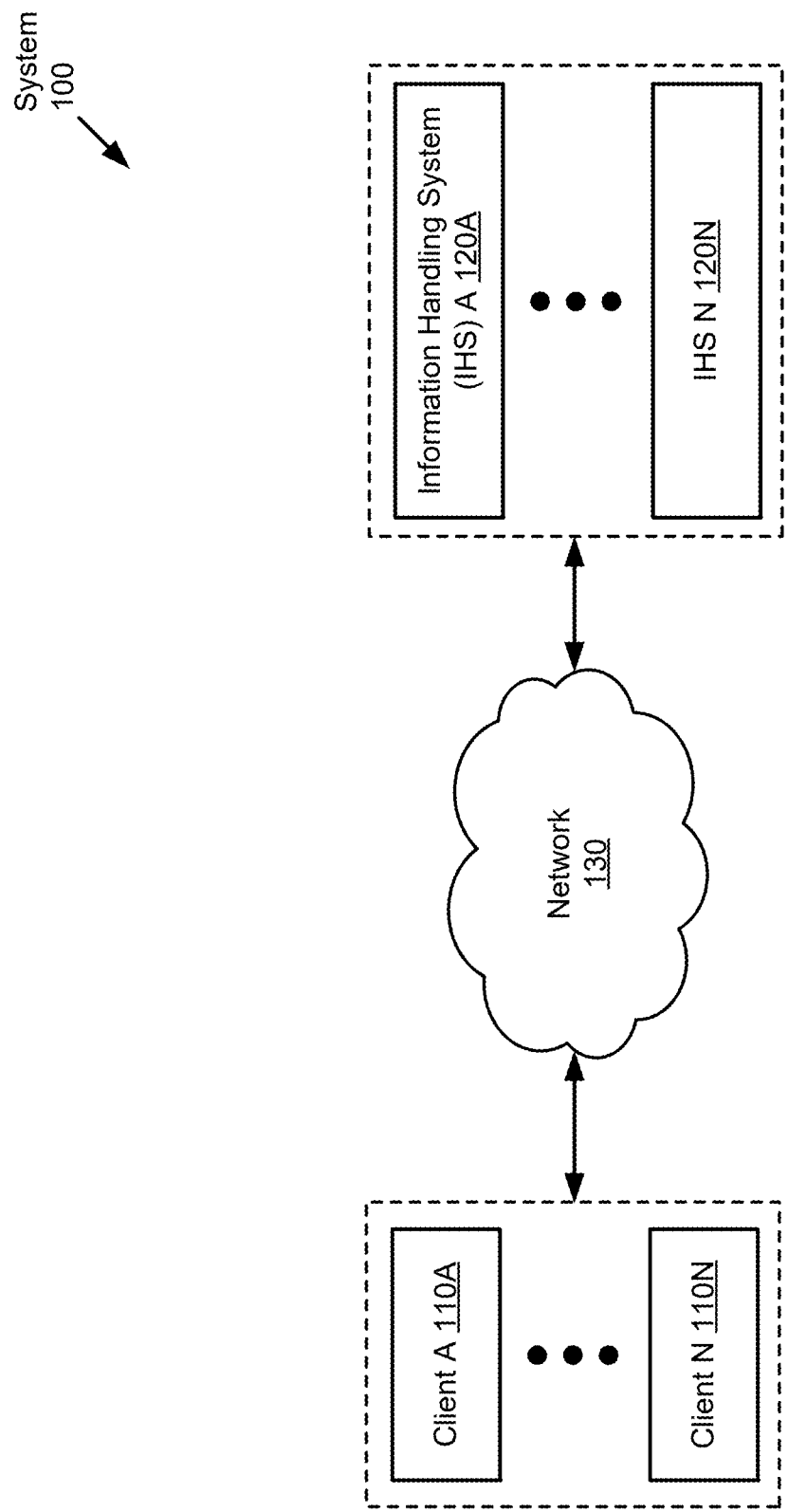
FIG. 1.1

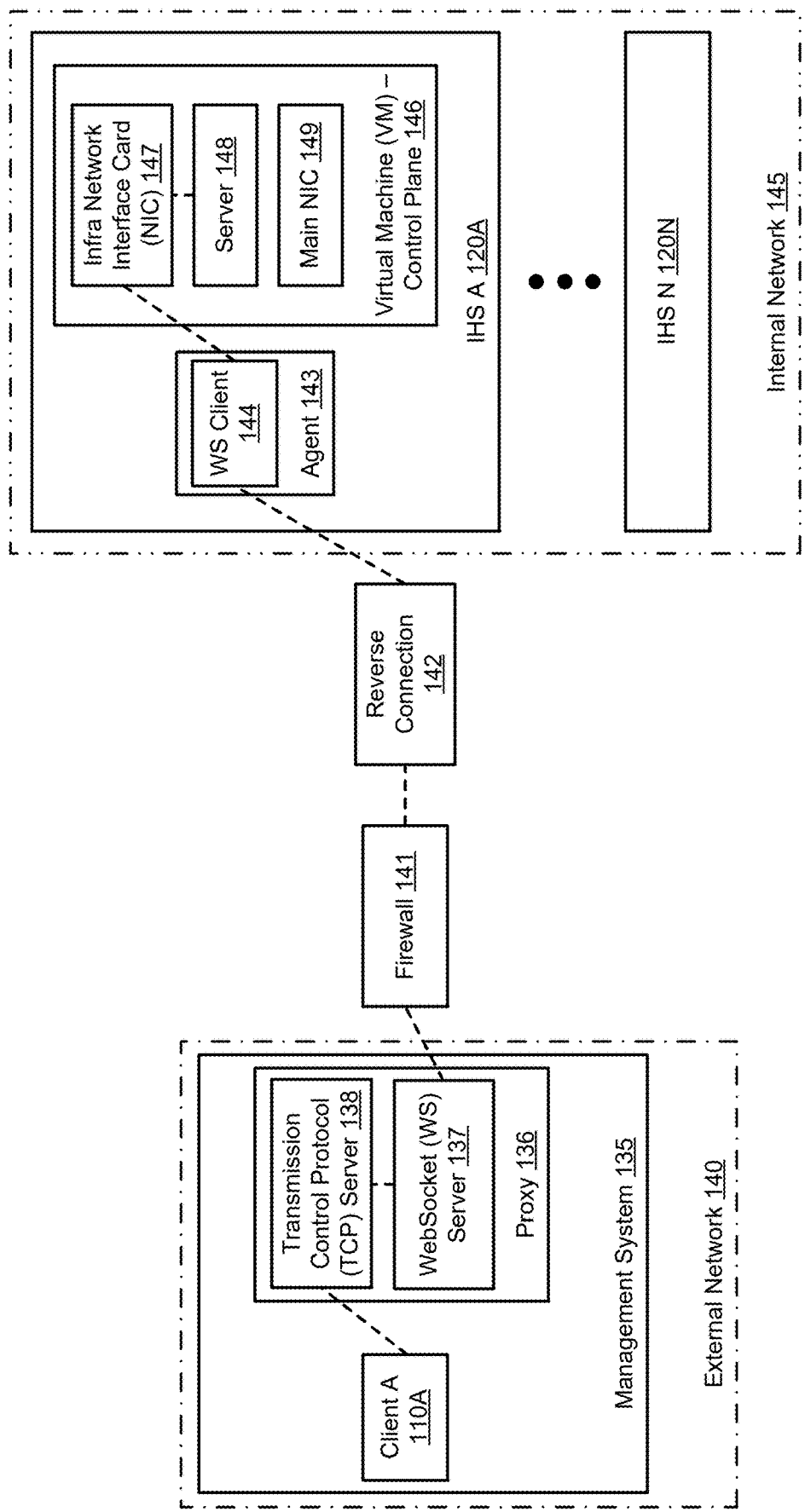
FIG. 1.2

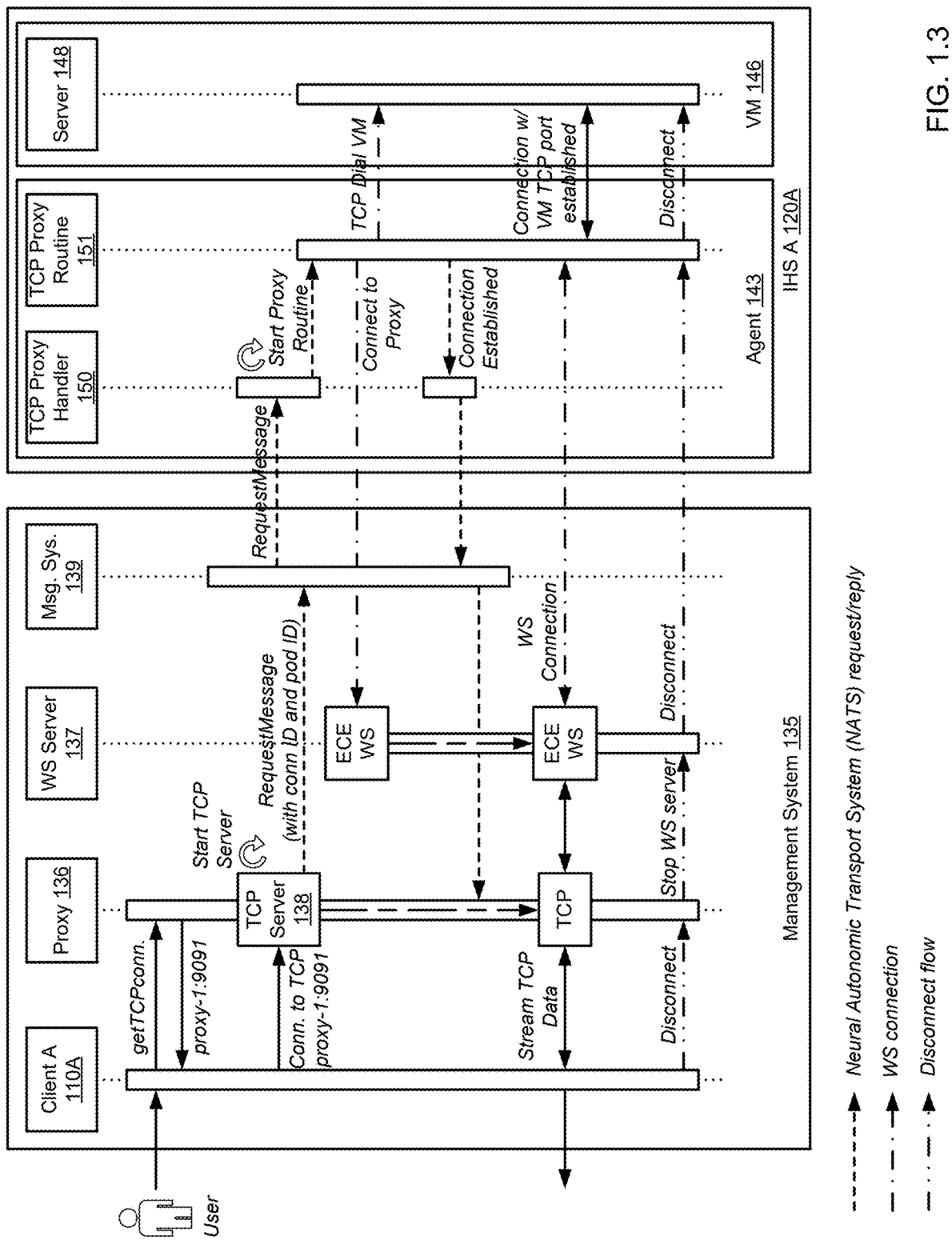
FIG. 1.3

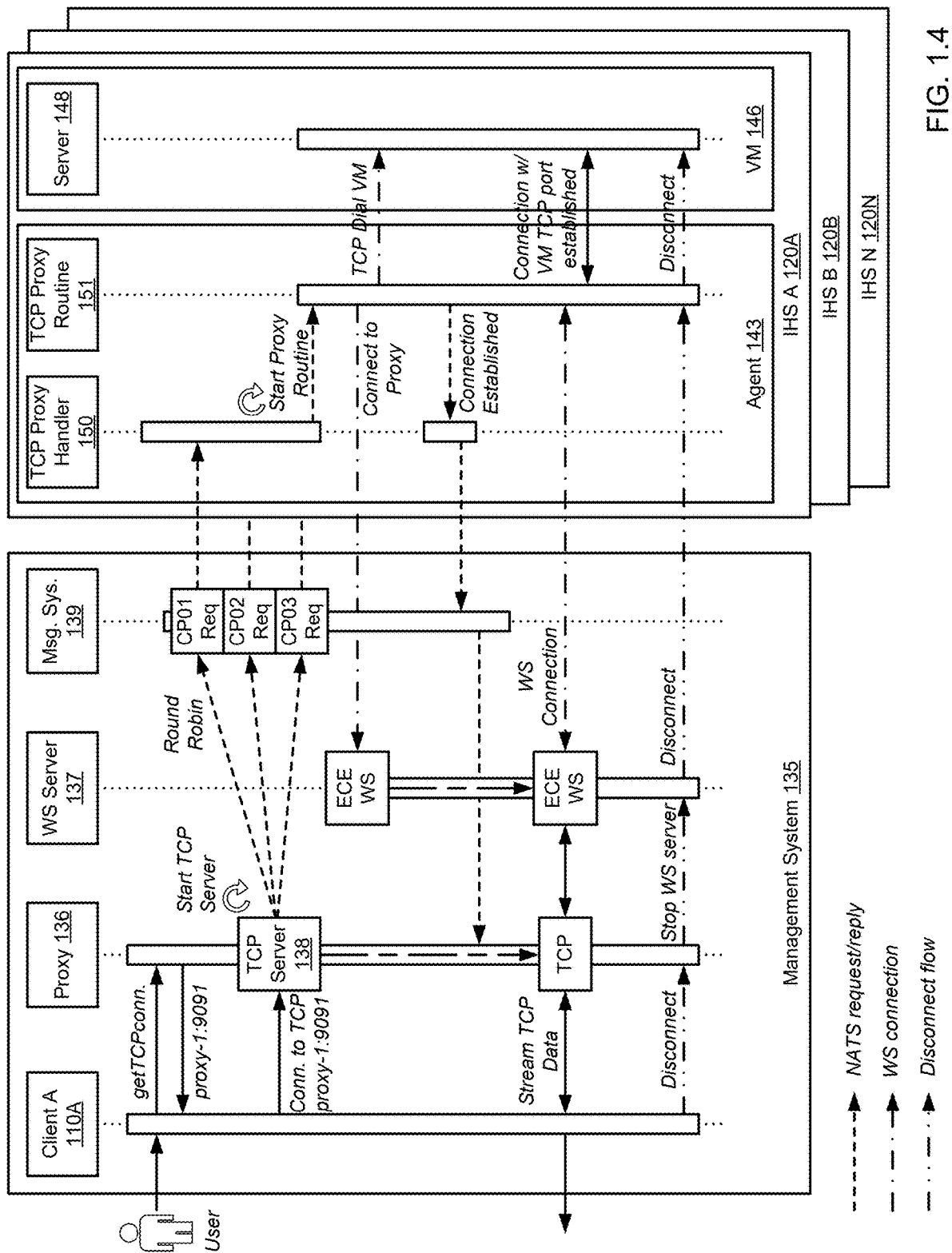
FIG. 1.4

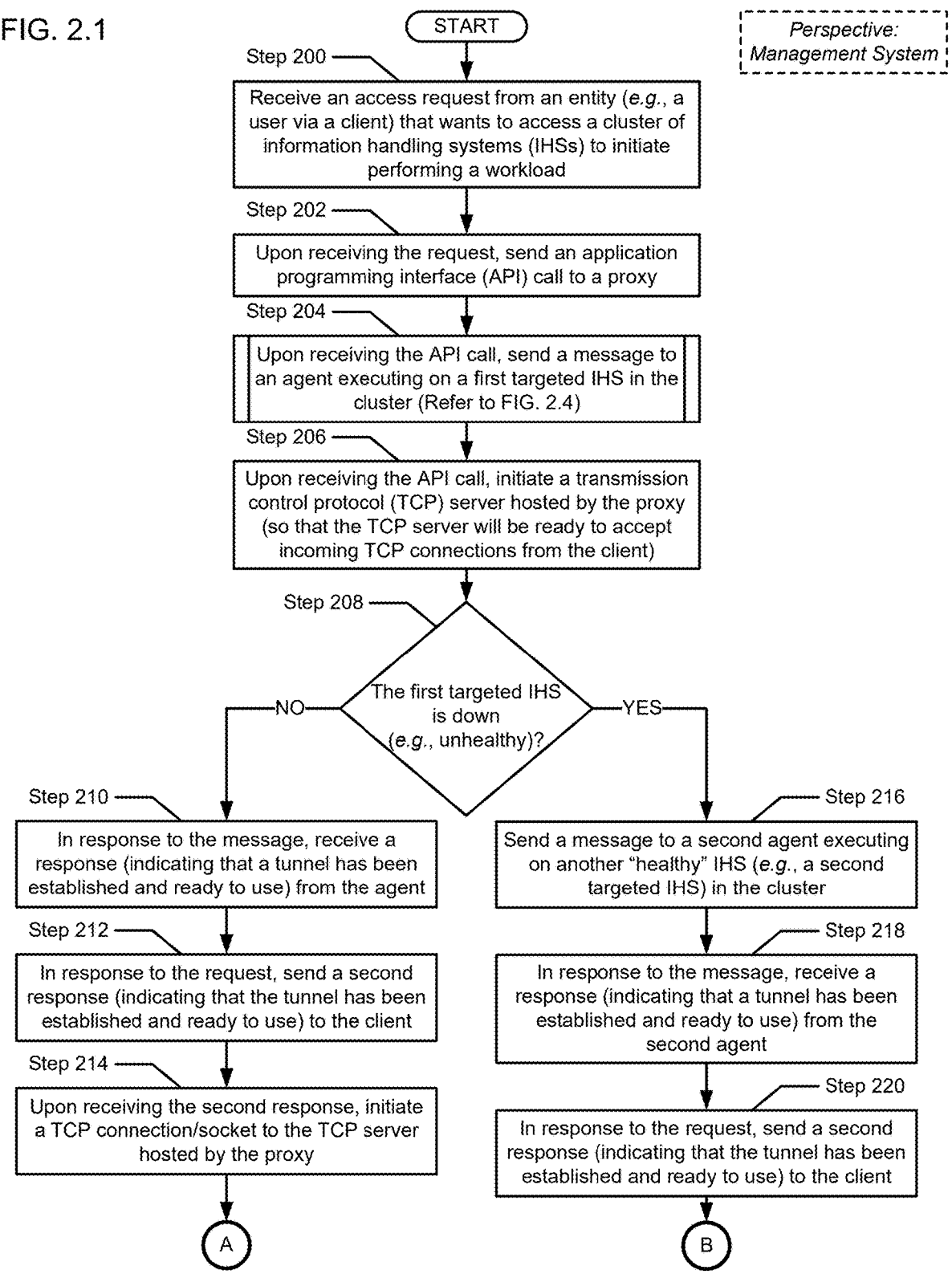

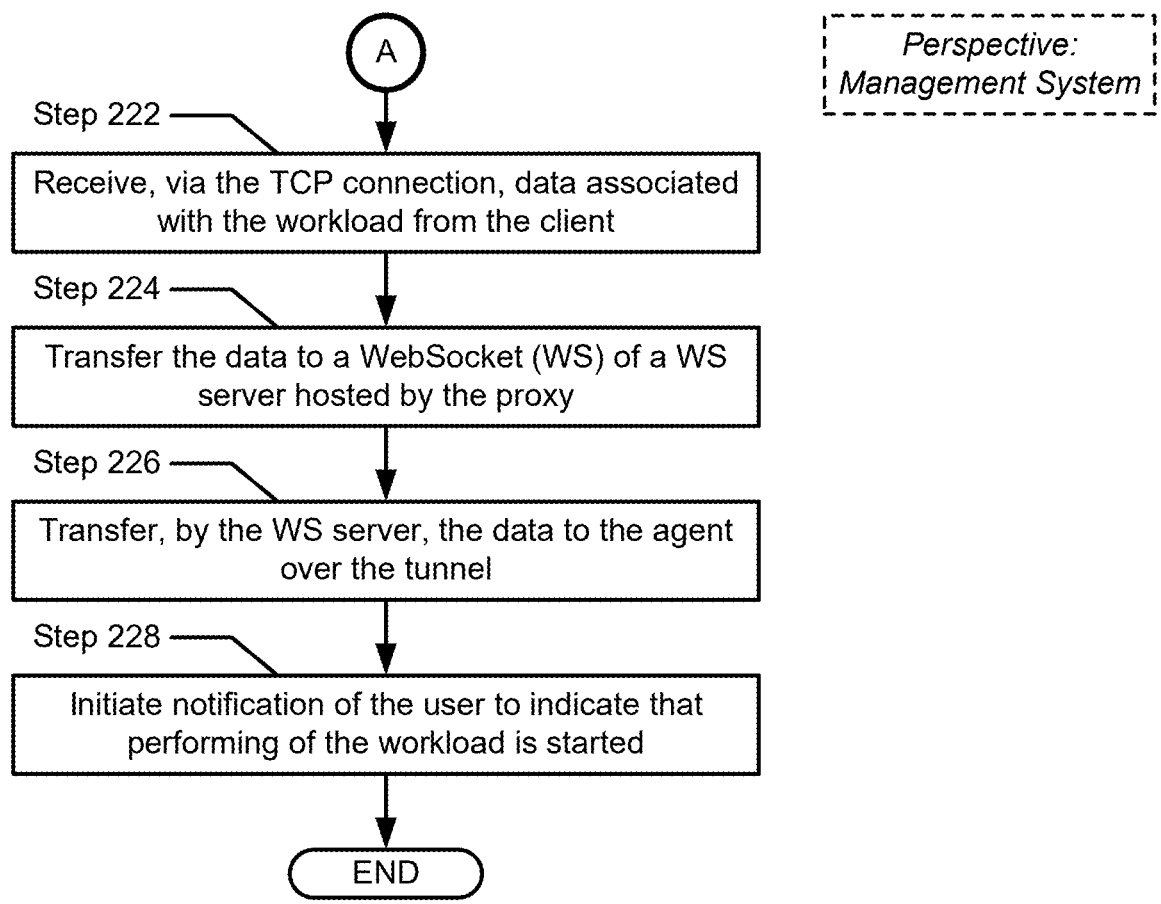
FIG. 2.2

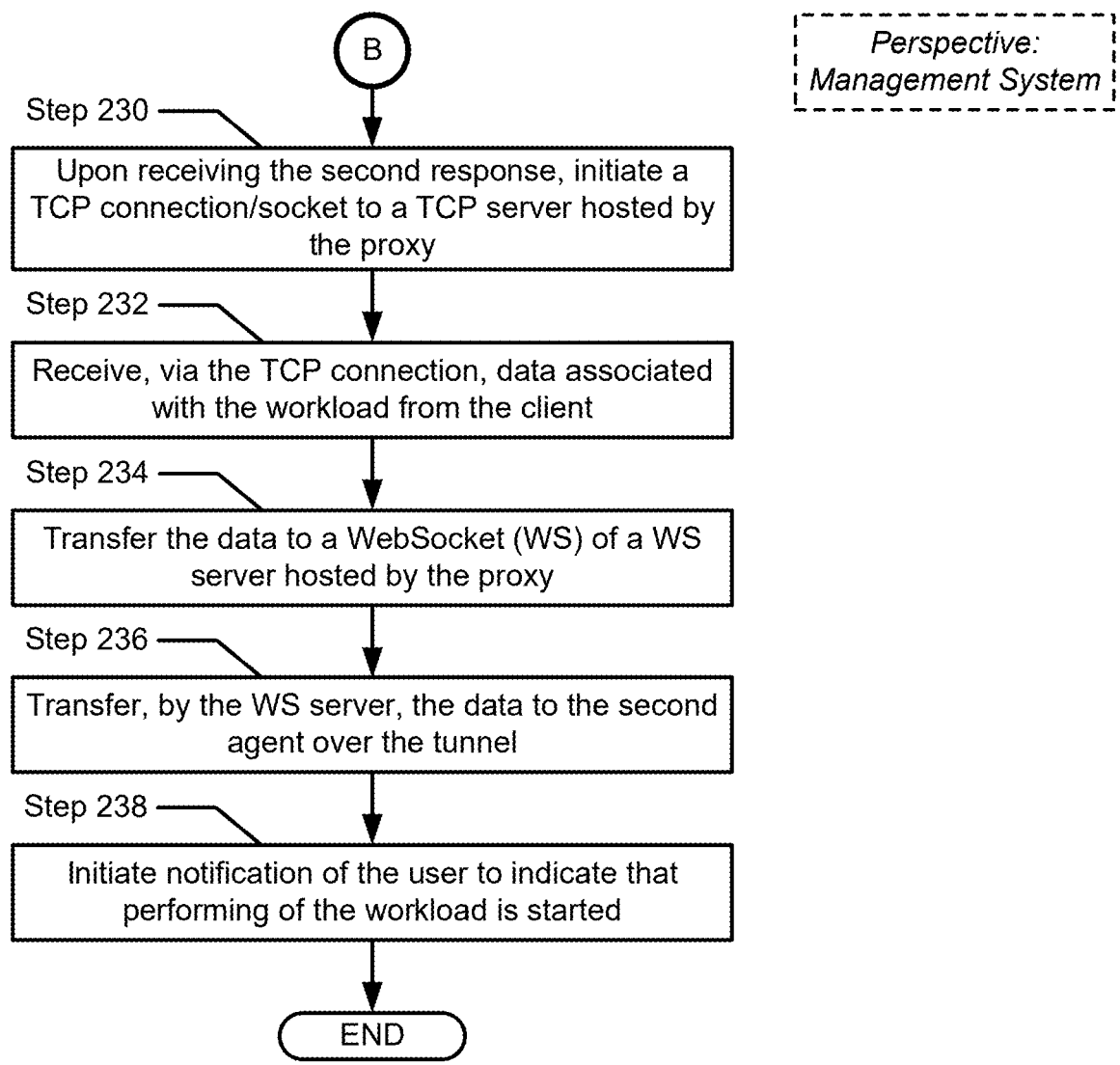
FIG. 2.3

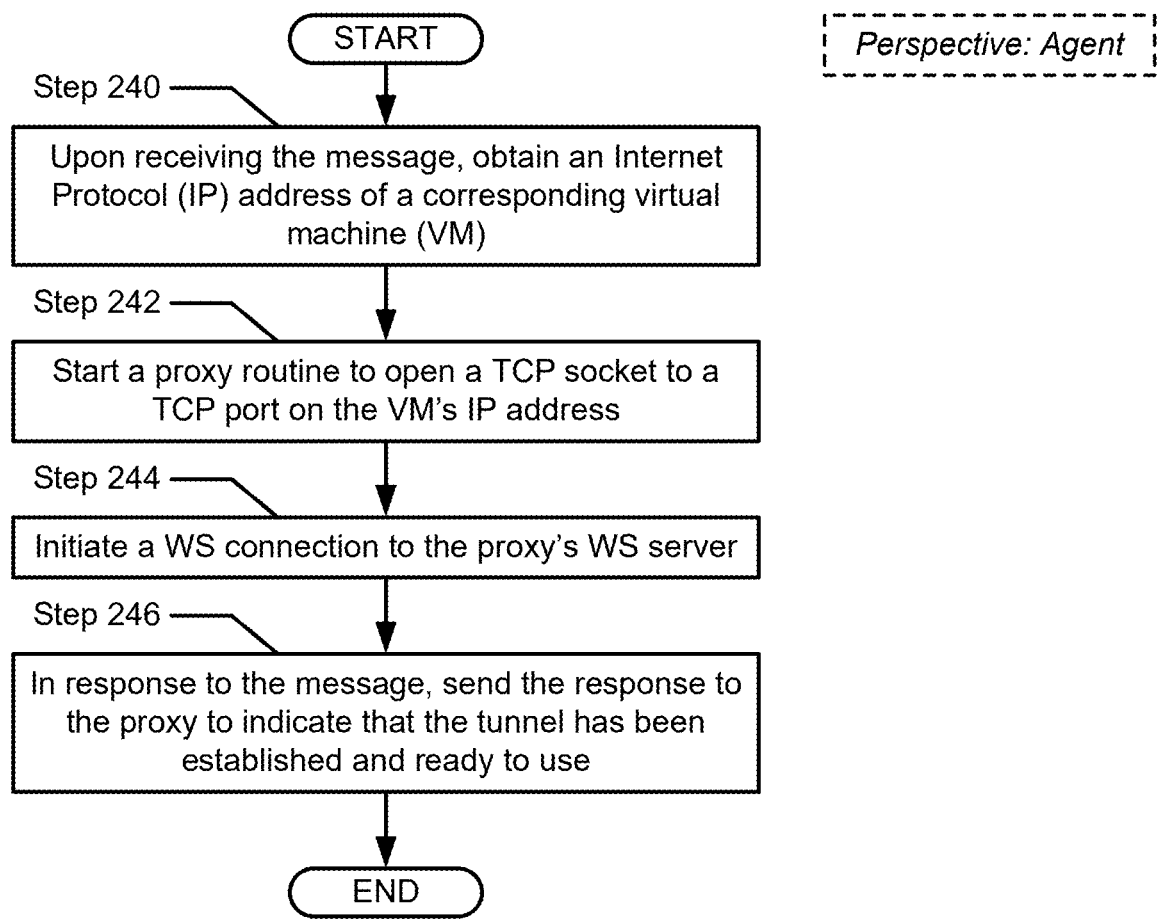
FIG. 2.4

METHOD AND SYSTEM FOR HIGH AVAILABILITY LOAD BALANCING OVER A REVERSE CONNECTION

BACKGROUND

As the value and use of information continues to increase, individuals and businesses seek additional ways to process and store information. One option available to users (e.g., administrators) is information handling systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow IHSs to be general or configured for a specific user or a specific use such as financial transaction processing, airline ticket reservations, enterprise data storage, or global communications. Further, IHSs may include a variety of hardware and software components that may be configured to process, store, and communicate information and may include one or more computer systems, graphics interface systems, data storage systems, networking systems, and mobile communication systems. IHSs may also implement various virtualized architectures. Data and voice communications among IHSs may be via networks that are wired, wireless, or some combination.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 shows a diagram of a system in accordance with one or more embodiments disclosed herein.

FIG. 1.2 shows a diagram of the system (from a different perspective) in accordance with one or more embodiments disclosed herein.

FIG. 1.3 shows a diagram illustrating how to generate a reverse connection between an external network and an internal network in accordance with one or more embodiments disclosed herein.

FIG. 1.4 shows a diagram illustrating how to manage workload balancing over the reverse connection in accordance with one or more embodiments disclosed herein.

FIGS. 2.1-2.4 show a method for managing workload balancing over the reverse connection in accordance with one or more embodiments disclosed herein.

DETAILED DESCRIPTION

Figure 3:
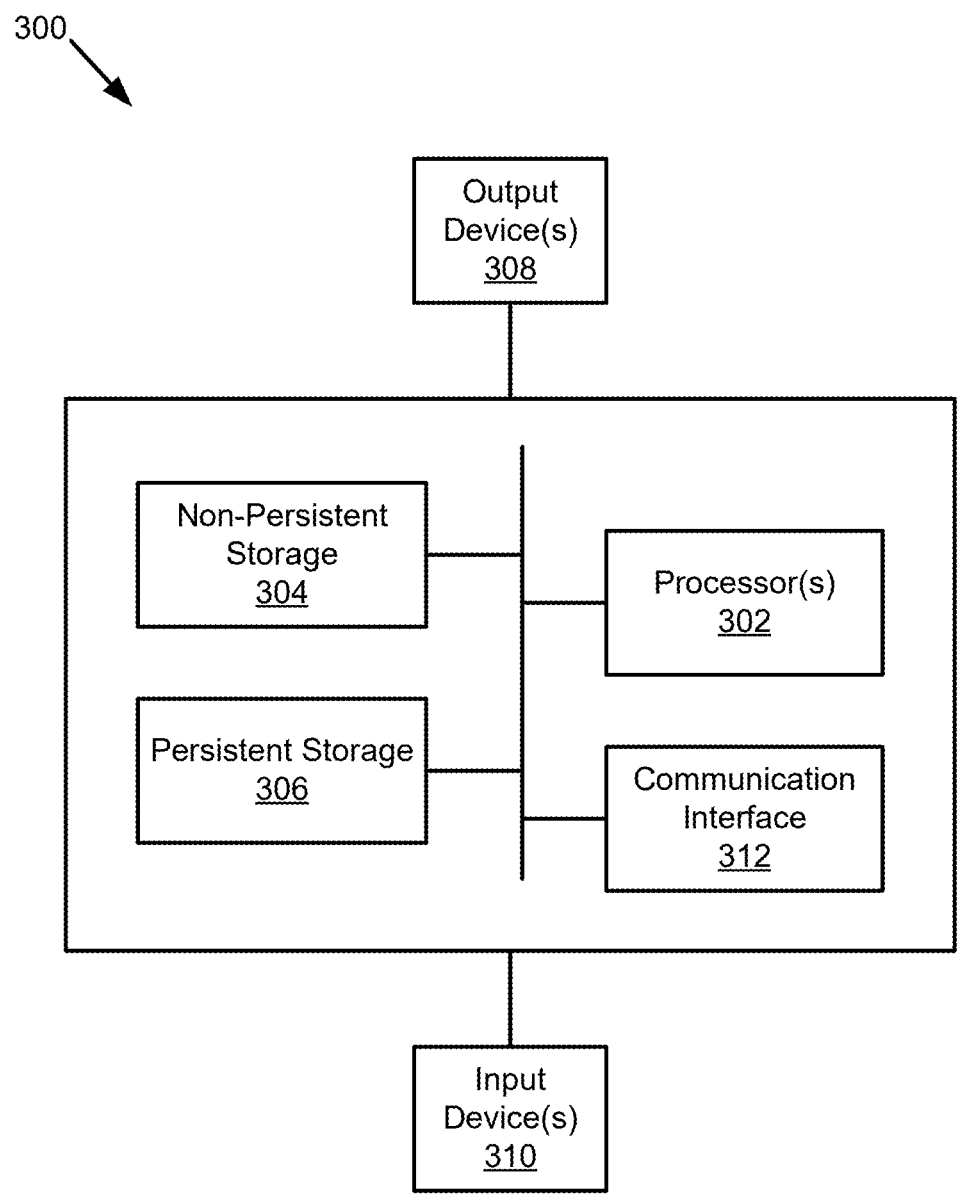
FIG. 3 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a cluster (e.g., a Kubernetes cluster) includes a master node (e.g., a control plane) and a set of worker nodes/machines that hosts and/or executes one or more workloads/applications. Traditionally, a master node (of a cluster) manages one or more worker nodes (of the cluster), including workloads that are assigned to those worker nodes. In production environments, a master node usually executes across multiple computing devices and, as indicated above, a cluster (that is managed by the master node)

usually executes multiple worker nodes in order to provide fault-tolerance and high-availability (across the cluster).

In most cases, in a high-availability cluster (with multiple control planes), a load balancer is provided to clients (e.g., computing devices used by users) and worker nodes so that clients and worker nodes can access to one or more control planes. Usually, a load balancer (e.g., a service executing on a high-availability cluster) serves for two purposes: (i) distributing a workload equally across all the control planes of the cluster and (ii) ensuring high-availability (across the cluster) by routing one or more requests (e.g., received from a user via a client) to available control planes if one of the control planes is down (e.g., offline, non-responsive, etc.).

Typically, in order to manage a cluster, one assumes that a network path from a client to a cluster management server (e.g., a Rancher server) is open. However, in some scenarios, this assumption may cause problems. For example, consider a scenario in which the cluster management server is executing on a public network (e.g., a public Internet Protocol (IP) environment, an external network, etc.) and the cluster (that is managed by the cluster management server) is executing on a private network (e.g., an internal network), behind a firewall (which may cause problems with respect to sending a request from the cluster management server to the cluster).

A reverse connection (e.g., a reverse transmission control protocol (TCP) connection, a reverse TCP proxy over WebSocket, etc.) is usually used to bypass firewall caused problems (e.g., firewall restrictions) on open ports. In most cases, a firewall blocks incoming connections/requests (e.g., incoming traffic) on open ports, but does not block outgoing traffic. In a normal, forward connection, a client connects to a server through the server's open port, but in the case of a reverse connection, the client opens a port that the server connects to.

Further, implementing a reverse connection(s) to manage single hosts/nodes/IHSs are common, but managing a cluster of nodes that is established on a private network (where no direct access to the cluster is possible) is not feasible without using a reverse connection. As being a type of proxies, a reverse TCP proxy over a WebSocket may retrieve resources on behalf of a client from a server and use a WebSocket protocol as a tunnel to pass/permit TCP communication from the server to the client.

As indicated above, a reverse connection may overcome the problem of connecting to a host (that exists in an internal/private network) that only allows outgoing traffic (or outgoing network connectivity); however, a reverse connection does not overcome the problem of connecting to a load balancer virtual IP (executing on the internal network) (e.g., the load balancer virtual IP is still not accessible from the reverse connection).

In a given cluster, one or more master nodes and one or more worker nodes (e.g., guest virtual machines (VMs)) may be existing, in which each VM (or a set of VMs) may be executed on a physical host (that includes at least a hypervisor). In most cases, each VM may include two network interfaces: (i) an infrastructure network interface, which is connected to a reverse connection via an agent and (ii) a main network interface, which is connected to a local private network that is not accessible from outside.

For example, consider a scenario in which a client (executing on an external network) wants to access a cluster (executing on an internal network) that hosts a set of worker nodes and a set of master nodes. In this scenario, the client may be a computing device that a related user executes "kubectl" or "helm" commands. Because the client is being executed on the external network and the cluster is being executed on the internal network, the client has no direct access (e.g., network connectivity) to a VMs sub-network within the internal network (where, using a corresponding load balancer virtual IP, the worker nodes may connect to the master nodes). The client may only access VMs (that are hosted by the master nodes) via (i) a reverse connection (that is enabled through a proxy) and (ii) a corresponding infrastructure network interface(s), and the client has no access to the virtual IP on the internal network).

For at least the reasons/issues/problems discussed above and without requiring resource-intensive efforts (e.g., time, engineering, etc.), a fundamentally different approach/framework is needed (e.g., a framework/solution that provides high-availability workload balancing over a reverse connection; a framework to build load balancing and high-availability capabilities of a cluster over a reverse connection into a proxy; a framework to overcome use cases where direct network connectivity between a management system and a cluster it is managing is not possible; etc.).

Embodiments disclosed herein relate to methods and systems for workload balancing over a reverse connection. As a result of the processes discussed below, one or more embodiments disclosed herein advantageously ensure that, for a better user experience, a client (e.g., a computing device that executes on an external network) can access a cluster (e.g., a Kubernetes cluster that executes on an internal network) over a reverse connection with the same high-availability and workload balancing capabilities as the client were executing on the internal network.

The following describes various embodiments disclosed herein.

FIG. 1.1 shows a diagram of a system (100) in accordance with one or more embodiments disclosed herein. The system (100) includes any number of clients (e.g., Client A (110A), Client N (110N), etc.), a network (130), and any number of clusters (not shown) (where each cluster may include/host any number of IHSs (e.g., IHS A (120A), IHS N (120N), etc.)). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the clients (e.g., 110A, 110N, etc.), the IHSs (e.g., 120A, 120N, etc.), and the network (130) may be (or may include) physical hardware or logical devices, as discussed below. While FIG. 1.1 shows a specific configuration of the system (100), other configurations may be used without departing from the scope of the embodiments disclosed herein. For example, although the clients (e.g., 110A, 110N, etc.) and the IHSs (e.g., 120A, 120N, etc.) are shown to be operatively connected through a communication network (e.g., 130), the clients (e.g., 110A, 110N, etc.) and the IHSs (e.g., 120A, 120N, etc.) may be directly connected (e.g., without an intervening communication network).

Further, the functioning of the clients (e.g., 110A, 110N, etc.) and the IHSs (e.g., 120A, 120N, etc.) is not dependent upon the functioning and/or existence of the other components (e.g., devices) in the system (100). Rather, the clients (e.g., 110A, 110N, etc.) and the IHSs (e.g., 120A, 120N, etc.) may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment, a hybrid public-private computing environment, etc.) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users/owners of clients (e.g., 110A, 110N, etc.). For example, the system may be configured to organize unbounded, continuously generated data into a data stream. The system (100) may also represent a comprehensive middleware layer executing on computing devices (e.g., 300, FIG. 3) that supports application and storage environments. In one or more embodiments, the system (100) may support one or more VM environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IHSs (e.g., 120A, 120N, etc.)) from the users. By doing so, the users may utilize different computing devices (e.g., 300, FIG. 3) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IHSs (e.g., 120A, 120N, etc.)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to an IHS (e.g., 120A). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.)

exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored to storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with an IHS (e.g., 120A). For example, the clients may issue requests to the IHS to receive responses and interact with various components of the IHS. The clients may also request data from and/or send data to the IHS (for example, the clients may transmit information to the IHS that allows the IHS to perform computations, the results of which are used by the clients to provide services to the users). As yet another example, the clients may utilize computer-implemented services provided by the IHS. When the clients interact with the IHS, data that is relevant to the clients may be stored (temporarily or permanently) in the IHS.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with an IHS (e.g., 120A) that perform computations necessary to provide the computer-implemented services, (iv) using the computations performed by the IHS to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IHS (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., 120A, 120N, etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an IP address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Further, in one or more embodiments, a client (e.g., 110A) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored to the persistent storage, that when executed by the processor(s) of the computing device cause the computing device to perform the functionality of the client described throughout the application.

Alternatively, in one or more embodiments, the client (e.g., 110A) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, a cluster may be, for example, a heterogeneous cluster, which includes at least one node with high-bandwidth (HBM) enabled CPUs (e.g., IHS A (120A)) and at least one node without HBM enabled CPUs (e.g., IHS N (120N)). Further, a cluster may correspond to a geographic region in the world and/or a zone (e.g., a business operation zone) of an organization.

In one or more embodiments, an IHS (e.g., 120A) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, an IHS (e.g., 120A) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to a database (not shown) for management of the data and/or for storage of the data (while pushing the data, the IHS may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IHS (e.g., 120N) for review and/or other human interactions; (x) exchange data with other devices registered in/to the network (130) in order to, for example, participate in a collaborative workload placement (e.g., the IHS may split up a request (e.g., an operation, a task, an activity, etc.) with another IHS, coordinating its efforts to complete the request more efficiently than if the IHS had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database; (xv) provide (e.g., via a broadcast, multicast, or unicast mechanism) information (e.g., a location identifier, the amount of available resources, etc.) associated with the IHS to other IHSs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., the IHS may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IHS may communicate with, for example, the database and/or other storage devices in the system (100).

As described above, an IHS (e.g., 120A) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IHS. Specifically, the service manager (i) may identify services to be provided by the IHS (for example, based on the number of users using the clients) and (ii) may limit communications of the clients to receive IHS provided services.

For example, the priority (e.g., the user access level) of a user may be used to determine how to manage computing resources of the IHS to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IHS (e.g., while the computing resources of the IHS may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high-priority user (e.g., a privileged user, a user with a user access level of 9/10). In such a case, the user level of that user may indicate that more ports are to be opened than were for the first user so that (i) the IHS may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single IHS (e.g., 120A) is considered above, the term "IHS" includes any collection of systems or sub-systems that individually or jointly execute a set, or multiple sets, of instructions to provide one or more computer-implemented services. For example, a single IHS may provide a computer-implemented service on its own (i.e., independently) while multiple other IHSs may provide a second computer-implemented service cooperatively (e.g., each of the multiple other IHSs may provide similar and or different services that form the cooperatively provided service).

As described above, an IHS (e.g., 120A) may provide any quantity and any type of computer-implemented services. To provide computer-implemented services, the IHS may be a heterogeneous set, including a collection of physical components/resources configured to perform operations of the IHS and/or otherwise execute a collection of logical components/resources of the IHS.

In one or more embodiments, a "computing" resource (e.g., a measurable quantity of a compute-relevant resource type that may be requested, allocated, and/or consumed) may be (or may include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc.

In one or more embodiments, resources (or computing resources) of an IHS (e.g., 120A) may be divided into three logical resource sets: a compute resource set, a control resource set, and a hardware resource set. Different resource sets, or portions thereof, from the same or different IHSs may be aggregated (e.g., caused to operate as a computing device) to instantiate a composed IHS having at least one resource set from each set of the three resource set model.

In one or more embodiments, a hardware resource set (e.g., of an IHS) may include (or specify), for example (but not limited to): a configurable CPU option (e.g., a valid/ legitimate vCPU count per-IHS option), a minimum user count per-IHS, a maximum user count per-IHS, a configurable network resource option (e.g., enabling/disabling single-root input/output virtualization (SR-IOV) for specific IHSs), a configurable memory option (e.g., maximum and minimum memory per-IHS), a configurable GPU option (e.g., allowable scheduling policy and/or vGPU count combinations per-IHS), a configurable DPU option (e.g., legitimacy of disabling inter-integrated circuit (I2C) for various IHSs), a configurable storage space option (e.g., a list of disk cloning technologies across all IHSs), a configurable storage input/output option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), a virtual NIC (vNIC) count per-IHS, a wake on LAN support configuration (e.g., supported/enabled, not supported/disabled, etc.), a swap space configuration per-IHS, a reserved memory configuration (e.g., as a percentage of configured memory such as 0-100%), a memory ballooning configuration (e.g., enabled, disabled, etc.), a vGPU count per-IHS, a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), a backup frequency (e.g., hourly, daily, monthly, etc.), a hardware virtualization configuration, etc.

In one or more embodiments, a control resource set (e.g., of an IHS) may facilitate formation of composed IHSs. To do so, a control resource set may prepare any quantity of computing resources from any number of hardware resource sets (e.g., of the corresponding IHS and/or other IHSs) for presentation. Once prepared, the control resource set may present the prepared computing resources as bare metal resources to an orchestrator (not shown). By doing so, a composed IHS may be instantiated.

To prepare the computing resources of the hardware resource sets for presentation, the control resource set may employ, for example, virtualization, indirection, abstraction, and/or emulation. These management functionalities may be transparent to applications hosted by the resulting composed IHS (e.g., thereby relieving those applications from workload overhead). Consequently, while unknown to components of a composed IHS, the composed IHS may operate in accordance with any number of management models thereby providing for unified control and management of the composed IHS.

In one or more embodiments, the orchestrator may implement a management model to manage computing resources (e.g., computing resources provided by one or more hardware components/devices of IHSs) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the embodiments disclosed herein.

In one or more embodiments, in conjunction with the orchestrator, a system control processor (not shown) of a related IHS may cooperatively enable hardware resource sets of other IHSs to be prepared and presented as bare metal resources to composed IHSs. The system control processor may be operably connected to external resources (not shown) via a network interface and the network (130) so that the system control processor may prepare and present the external resources as bare metal resources as well.

In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

While an IHS (e.g., 120A) has been illustrated and described as including a limited number of specific components and/or hardware resources, the IHS (e.g., 120A) may include additional, fewer, and/or different components without departing from the scope of the embodiments disclosed herein. One of ordinary skill will appreciate that an IHS (e.g., 120A) may perform other functionalities without departing from the scope of the embodiments disclosed herein.

In one or more embodiments, an IHS (e.g., 120A) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored to the persistent storage, that when executed by the processor(s) of the computing device cause the computing device to perform the functionality of the IHS described throughout the application.

Alternatively, in one or more embodiments, similar to a client (e.g., 110A), the IHS (e.g., 120A) may also be implemented as a logical device.

In one or more embodiments, the system (100) may also include a database (not shown). The database may provide long-term, durable, high read/write throughput data storage/protection with near-infinite scale and low-cost. The database may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, the database may be implemented using physical devices that provide data storage services (e.g., storing data and providing copies of previously stored data). The devices that provide data storage services may include hardware devices and/or logical devices. For example, the database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database may include a memory device (e.g., a dual in-line memory device), in which data is stored and from which copies of previously stored data are provided. As yet another example, the database may include a persistent storage device (e.g., an SSD), in which data is stored and from which copies of previously stored data is provided. As yet another example, the database may include (i) a memory device in which data is stored and from which copies of previously stored data are provided and (ii) a persistent storage device that stores a copy of the data stored to the memory device (e.g., to provide a copy of the data in the event that power loss or other issues with the memory device that may impact its ability to maintain the copy of the data).

Further, the database may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IHS (e.g., 120N) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to an IHS (e.g., 120A)); one or more points-in-time and/or one or more periods of time associated with a data recovery event; data for execution of applications/services (including IHS applications and associated endpoints); corpuses of annotated data used to build/generate and train processing classifiers for trained ML models; linear, non-linear, and/or ML model parameters; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IHS (e.g., 120A); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IHS (e.g., 120N); a size of each of the set of assets protected; a number of each type of a set of data protection policies implemented by a user; configuration information associated with an IHS (e.g., 120A) (to manage security, network traffic, network access, or any other function/operation performed by the IHS); a job detail of a job (e.g., a data protection job, a data restoration job, a log retention job, etc.) that has been initiated by an IHS (e.g., 120A); a type of the job (e.g., a non-parallel processing job, a parallel processing job, an analytics job, etc.); information associated with a hardware resource set of an IHS (e.g., 120A); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); information regarding an administrator (e.g., a high-priority trusted administrator, a low-priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by a manufacturer (e.g., a single data protection policy should not protect more than 100 assets; for a dynamic NAS, maximum one billion files can be protected per day, etc.); one or more device state paths corresponding to a client; an existing knowledge base (KB) article; a technical support history documentation of a customer/user; a port's user guide; a port's release note; a community forum question and its associated answer; a catalog file of an application upgrade; details of a compatible operating system (OS) version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; etc.

In one or more embodiments, metadata (e.g., system logs, application logs, etc.) may be obtained (or dynamically fetched) as they become available (e.g., with no user manual intervention), or by an analyzer (not shown) of an IHS (e.g., 120A) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer receives a metadata analysis request (or a health check request for a client), (ii) another IHS of the system (100) accumulates the metadata and provides them to the analyzer at fixed time intervals, or (iii) the database stores the metadata and notify the analyzer to access the metadata from the database. In one or more embodiments, metadata may be access-protected for transmission from a corresponding client (e.g., 110A) to the analyzer, e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored to the database, any of the aforementioned data structures may be stored to different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) and/or by the administrators based on, for example, newer (e.g., updated) versions of SLAs. The unstructured and/or structured data may also be updated when, for example (but not limited to): newer system logs are received, a state of an IHS (e.g., 120A) is changed, etc.

While the database has been illustrated and described as including a limited number and type of data, the database may store additional, less, and/or different data without departing from the scope of the embodiments disclosed herein. One of ordinary skill will appreciate that the database may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., clients, IHSs, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IHSs through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

While FIG. 1.1 shows a configuration of components, other system configurations may be used without departing from the scope of the embodiments disclosed herein.

Turning now to FIG. 1.2, FIG. 1.2 shows a diagram of the system (e.g., 100, FIG. 1.1), from a different perspective, in accordance with one or more embodiments disclosed herein. Referring to FIG. 1.2, a management system (135) may be part of an external network (140) (e.g., a public network, a public IP environment, a shared network, etc.) and may include, for example, a client (e.g., Client A (110A)) and a proxy (136), in which the proxy (136) may include a TCP server (138) and a WebSocket server (137). Further, the IHSs (e.g., IHS A (120A), IHS N (120N), etc.) may be part of an internal network (145) (e.g., a private network that is behind a firewall (141)) and an IHS (e.g., 120A) may include, for example, an agent (143) and a VM (146) (e.g., VM-Control Plane), in which the agent (143) may include a WebSocket client (144) and the VM (146) may include an infrastructure NIC (147), a server (148) (e.g., an API server that allows, at least, different applications/components of the VM (146) to communicate with one another), and a main NIC (149). The external network (140) and the internal network (145) may include additional, fewer, and/or different components/computing devices without departing from the scope of the embodiments disclosed herein. Each component shown in each particular network (e.g., in the external network (140) and in the internal network (145)) may be operably connected to any of the other component via any combination of wired and/or wireless connections. In one or more embodiments, at least a portion of the external network (140) and at least a portion of the internal network (145) may be part of the network (e.g., 130, FIG. 1.1).

As used herein, a "server" may be a physical computing device or a logical computing device (e.g., a VM), and may be configured for: (i) hosting and maintaining various workloads and (ii) providing a computing environment (e.g., computing power and storage) whereon workloads may be implemented. In one or more embodiments, a server (e.g., the TCP server (138), the WebSocket server (137), the server (148), etc.) may be a heterogeneous set, including different types of hardware components and/or different types of OSs.

In one or more embodiments, the proxy (136) may be a gateway (e.g., an API gateway) that hosts the TCP server (138) and the WebSocket server (137). The proxy (136) may include functionality to, e.g.: (i) in conjunction with the agent (143), generate one or more communication channels between Client A (110A) and VMs of IHS A (120A); (ii) manage scaling of itself based on real-time network traffic volume; (iii) make easy to generate, publish, maintain, monitor, and secure APIs (e.g., RESTful APIs, WebSocket APIs, etc.) at any scale that enable real-time, two-way communication; (iv) support containerized and serverless workloads, as well as web applications; and/or (v) aggregate various services required to fulfill requirements of API calls. One of ordinary skill will appreciate that the proxy (136) may perform other functionalities without departing from the scope of the embodiments disclosed herein. The proxy (136) may be implemented using hardware, software, or any combination thereof.

In one or more embodiments, the TCP server (138) may include functionality to listen on a well-known port, IP address, and/or port pair and accepts connections (or connection requests) from TCP clients (e.g., Client A (110A)). A TCP client may initiate a connection request to the proxy (136) in order to setup a connection with the TCP server (138), in which the TCP server (138) may accept multiple connections on a TCP socket. One of ordinary skill will appreciate that the TCP server (138) may perform other functionalities without departing from the scope of the embodiments disclosed herein. The TCP server (138) may be implemented using hardware, software, or any combination thereof.

In one or more embodiments, the WebSocket server (137) may include functionality to listen on any port of the TCP server (138) (that follows a specific protocol) for data communication/transfer. One of ordinary skill will appreciate that the WebSocket server (137) may perform other functionalities without departing from the scope of the embodiments disclosed herein. The WebSocket server (137) may be implemented using hardware, software, or any combination thereof.

In one or more embodiments, the firewall (141) may be a network monitoring/security component that monitors incoming and outgoing network traffic, in which the firewall (141) may decide whether to allow or block specific traffic based on a defined set of security rules. One of ordinary skill will appreciate that the firewall (141) may perform other functionalities without departing from the scope of the embodiments disclosed herein. The firewall (141) may be implemented using hardware, software (e.g., a software as a service (SaaS)), or any combination thereof.

In one or more embodiments, the WebSocket client (144) may include functionality to leverage a WebSocket API to communicate with one or more WebSocket servers (e.g., 137) using a WebSocket protocol, in which the WebSocket API may make possible to open a two-way interactive data communication session between the WebSocket client (144) and the WebSocket server (137). One of ordinary skill will appreciate that the WebSocket client (144) may perform other functionalities without departing from the scope of the embodiments disclosed herein. The WebSocket client (144) may be implemented using hardware, software, or any combination thereof.

As discussed above, the VM (146) may include the infrastructure NIC (147), the server (148), and the main NIC (149). In one or more embodiments, the VM (146) may be executed using computing resources of IHS A (120A). The VM (146) (and applications hosted by the VM (146)) may generate data (e.g., VM data) that are stored to storage/ memory resources of IHS A (120A) and/or to the database (discussed above in reference to FIG. 1.1), in which the VM data may reflect, at least, a state (e.g., healthy, unhealthy, etc.) of the VM (146). In one or more embodiments, the VM (146) may provide computer-implemented services to certain users (e.g., users that are allowed to access the internal network (145)), and may host instances of databases, email servers, or other applications that are accessible to those users.

As used herein, "unhealthy" may refer to a compromised health state (e.g., an unhealthy state), indicating a corresponding entity (e.g., a hardware component, the VM (146), Client A (110A), etc.) has already or is likely to, in the future, be no longer able to provide the services that the entity has previously provided. The health state determination may be made via any method based on the aggregated health information without departing from the scope of the embodiments disclosed herein.

In one or more embodiments, the VM (146) (and components of the VM (146), such as the server (148)) may utilize an infrastructure interface (provided by the infrastructure NIC (147)) to communicate with other devices/components of the system (e.g., 100, FIG. 1.1), in which the infrastructure NIC (147) is connected to the reverse connection (142) via the agent (143). The infrastructure NIC (147) may include one or more systems, apparatuses, or devices that enable the VM (146) to communicate and/or interface with other devices, services, and/or components that are located externally to the VM (146) (e.g., devices, services, and/or components located in the management system (135)). These devices, services, and/or components may interface with the VM (146) via the reverse connection (142) and the agent (143). In one or more embodiments, the infrastructure NIC (147) may enable the VM (146) to communicate using any suitable transmission protocol and/ or standard.

In one or more embodiments, the VM (146) (and components of the VM (146), such as the server (148)) may utilize a main interface (provided by the main NIC (149)) to communicate with other devices/components of the system (e.g., 100, FIG. 1.1) executing on the internal network (145), which is not accessible from outside. For example, the VM (146) may use the main NIC (149) to communicate with a worker node (that is being executed on another IHS (e.g., 120N)) over the internal/local network (145).

The main NIC (149) may include one or more systems, apparatuses, or devices that enable the VM (146) to communicate and/or interface with other devices, services, and/ or components that are executing on the internal network (145). In one or more embodiments, the main NIC (149) may enable the VM (146) to communicate using any suitable transmission protocol and/or standard.

In one or more embodiments, the server (148) may be, for example, a Kubernetes API server or a "VM" TCP server, which may provide less, the same, or more functionalities and/or services (described above) comparing to the TCP server (138). For example, the server (148) may allow, at least, different applications/components of the VM (146) to communicate with one another.

One of ordinary skill will appreciate that the VM (146) may perform other functionalities without departing from the scope of the embodiments disclosed herein. The VM (146) may be implemented using hardware, software, or any combination thereof.

Referring to FIG. 1.2, the management system (135) executes on the external network (140) (illustrated by dash dot lines) and, at least, manages hosts/IHSs (e.g., 120A, 120N, etc.) executing on the internal network (145) (illustrated by dash dot dot lines), behind the firewall (141) and a network address translation (NAT) module/agent (not shown) that only allow outbound traffic/connections (e.g., outbound connections from a host (e.g., 120A) to the management system (135)), but not the other way around (e.g., outbound connections from the management system (135) to the host (120A)).

One of ordinary skill will appreciate that the NAT module may perform other functionalities without departing from the scope of the embodiments disclosed herein. The NAT module may be implemented using hardware (e.g., a physical device including circuitry), software, or any combination thereof.

Further, assume here that Client A (110A) (or a workload executing on Client A) needs to connect to the server (148). To make this possible, the agent (143) initiates (and then maintains) a connection (e.g., a WebSocket connection (or a TCP connection) that is open along one direction only, from the internal network (145) to the external network (140)) to the management system (135) over a reverse connection (142) (e.g., a reverse TCP connection, a reverse TCP proxy over WebSocket, etc.), which is established through a tunnel (not shown) from IHS A (120A) to the management system (135) and allowed by the firewall (141). In one or more embodiments, the connection (e.g., a WebSocket connection) may be a connection to a messaging system/protocol (e.g., 139, FIG. 1.3), such as Apache Kafka, Message Queuing Telemetry Transport (MQTT), Neural Autonomic Transport System (NATS), etc., that the management system (135) may leverage to send one or more messages to the agent (143). At the end, Client A (110A) (or a workload executing on Client A) may connect to the server (148) over the reverse connection (142), as illustrated by half dash lines. Additional details regarding how to generate/create the reverse connection (142), for example, from Client A (110A) executing on the management system (135) to the VM (146) executing on IHS A (120A) are described below in reference to FIG. 1.3.

In one or more embodiments, IHS A (120A) may include one or more additional hardware components, not shown for clarity. For example, IHS A (120A) may include storage devices (that may have or provide functionalities and/or characteristics of the storage or memory resources described above in reference to FIG. 1.1) for storing machine-executable code (e.g., software, data, etc.), a platform controller hub (PCH) (e.g., to control certain data paths (e.g., system buses, data flow, etc.)), one or more communications ports for communicating with external devices as well as various input/output devices, one or more power supply units (PSUs) (e.g., to power hardware components of IHS A (120A)), different types of sensors (e.g., temperature sensors, voltage sensors, etc.) (that report to a baseboard management controller (BMC) about parameters such as temperature, cooling fan speeds, a power status, an OS status, etc.), processors and bus controllers, a display device, one or more environmental control components (e.g., cooling fans), one or more fan controllers within the BMC, additional processors within the BMC, a BMC update module, a component firmware update module, and a hypervisor (e.g., a VM monitor).

In one or more embodiments, the hypervisor may be configured to orchestrate an operation of, for example, the VM (146) by allocating computing resources of IHS A (120A) to the VM (146). The hypervisor may be a physical device including circuitry. The physical device may be, for example (but not limited to): an FPGA, an ASIC, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of IHS A (120A) that when executed by processing resources of IHS A (120A), cause IHS A (120A) to provide the functionality of the hypervisor.

Turning now to FIG. 1.3, FIG. 1.3 shows a diagram illustrating how to generate a reverse connection between an external network and an internal network (before describing how high-availability load balancing over a reverse connection is performed/managed in FIG. 1.4) in accordance with one or more embodiments disclosed herein. Referring to FIG. 1.3, the management system (135) may include, for example, Client A (110A), the proxy (136) (where the proxy (136) may include/host the TCP server (138)), the WebSocket server (137), and the messaging system (139) (where the management system (135) may leverage the messaging system to send messages to the agent (143)).

Further, IHS A (120A) may include, for example, the agent (143) (where the agent (143) may include/host a TCP proxy handler (150) and a TCP proxy routine (151), which are part of the WS Client (e.g., 144, FIG. 1.2)) and the VM (146) (where the VM (146) may include the server (148) as a VM TCP server). The management system (145) and IHS A (120A) may include additional, fewer, and/or different components/computing devices without departing from the scope of the embodiments disclosed herein.

Consider a scenario in which a user of a TCP client (e.g., Client A (110A)) wants to setup/establish/generate a reverse connection from the TCP client (executing on the management system (135)) to the VM (146) (executing on IHS A (120A)) so that, for example, the user may access to the VM (146) to execute a workload on the VM (146). To this end, Client A (110A) may initiate/send a connection request ("getTCPconnection") to the proxy (136) in order to setup a connection with the TCP server (138). Said another way, the TCP client (e.g., Client A (110A)) that is requiring a reverse connection to the VM (146) may make an API call (e.g., the connection request, a session establishment request, etc.) to the proxy (136) with, at least, the following parameters: (i) an identifier of the host (e.g., IHS A (120A)): a unique identifier of the host that the management system (135) may use to send a message/data to the host, (ii) an identifier of the VM (e.g., the VM (146)): a unique identifier of the VM (146) that the TCP client wants to connect to, and (iii) details of a TCP port: at least a TCP port number of the server (148) that the TCP client wants to connect.

In response to receiving the session establishment request, the proxy (136) (or the proxy service) may send a session establishment response to Client A (110A), in which the session establishment response specifies, at least, a port number of a TCP port (e.g., "proxy-1:9091") that Client A (110A) may use to connect to the TCP server (138). Thereafter, by connecting to "proxy-1:9091", Client A (110A) may connect to the TCP server (138).

Once Client A (110A) is connected to the TCP server (138), the proxy (136) may send, via the messaging system (139), a message to the agent (143) that is being executed on the targeted host (e.g., IHS A (120A)). In one or more embodiments, the message (e.g., "RequestMessage") may specify, at least, a connection identifier (e.g., "conn ID") and a pod identifier (e.g., "pod ID") to indicate which VM (hosted by IHS A (120A)) Client A (110A) wants to connect. In the meantime, the proxy (136) may start/boot the TCP server (138) so that the TCP server (138) may be ready to accept incoming TCP connections from Client A (110A) (e.g., TCP connections to stream/transmit TCP data from Client A (110A) to the TCP server (138)).

In this scenario, upon receiving the message via its TCP proxy handler (150), the agent (143) may perform the following steps: (i) obtain the VM's (146) IP address, (ii) start, via its TCP proxy handler (150) and using the infrastructure NIC (e.g., 147, FIG. 1.2) of the VM (146), a proxy routine process (where this process may initiate a TCP connection (e.g., "TCP Dial VM<VM-IP>: <TCP-port>") to a TCP port on the VM's (146) IP address), (iii) initiate a WebSocket connection to the proxy's (136) WebSocket server (137), and (iv) in response to the message, after initiating a WebSocket connection to the WebSocket server (137), send a response to the proxy (136) to indicate that a "secure" tunnel (e.g., a secure data transfer path; a secure/encrypted, point-to-point tunnel; etc.) has been established and ready to use (additionally, when the tunnel has been established using the socket connection, the reverse connection (e.g., 142, FIG. 1.2) between Client A (110A) and IHS A (120A) is also established). To this end, for example, (a) data that is sent by Client A (110A) will be transferred over the tunnel to the server (148) and (b) second data that is sent by the server (148) (in response to the data sent by Client A (110A)) will be transferred over the tunnel to Client A (110A), through different hops.

In one or more embodiments, as being a network/networking device and in conjunction with the proxy (136), the agent (143) may, at least: (i) provide a secure (e.g., an encrypted) tunnel by employing a tunneling protocol (e.g., the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol, etc.), (ii) establish efficient and secure connections (e.g., a virtual private network (VPN) connection (or a trust relationship), a secure socket layer VPN (SSL VPN) connection, an IP security (IPSec) based VPN connection, a transport layer security VPN (TLS VPN) connection, etc.) between networks, (iii) enable the usage of unsupported network protocols, (iv) manage access to resources between different networks (with more granular control) and track all the operations and network traffic logins, and/or (v) in some cases, enable users to bypass firewalls (e.g., provide endpoint-to-endpoint connections across a hybrid network without opening firewall rules in an enterprise network).

To this end, in order to manage an established tunnel, the proxy (136) and the agent (143) may include any logic, functions, rules, and/or operations to perform services or functionalities (for communications between a TCP client (e.g., Client A (110A)) and IHS A (120A)) such as, for example, SSL VPN connectivity, SSL offloading, switching/load balancing, hypertext transfer protocol secure (HTTPS)-encrypted connections, domain name service (DNS) resolution, and acceleration techniques (e.g., compression (e.g., a context-insensitive compression or context-sensitive compression by employing a delta-type compression model, a lossless compression model, or a lossy compression model), decompression, TCP pooling, TCP multiplexing, TCP buffering, caching, etc.).

As used herein, in networking, "tunneling" is a way for transporting data across a network using protocols (standardized set of rules for (i) formatting and processing data, and (ii) enabling computing devices to communicate with one another) that are not supported by that network. In general, a "secure tunnel" refers to a group of microservices that includes, for example (but not limited to): a UI server service, an API server service, a controller service, a tunnel connection service, an application mapping service, etc.

Tunneling works by encapsulating packets (where packets are small pieces of data that may be re-assembled at their destination into a larger file), in which an "encapsulated packet" is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections ("encryption" refers to the process of scrambling data in such a way that the data may only be unscrambled using a secret encryption key, where the process of undoing the encryption is called "decryption"). If a packet is completely encrypted (including the header), then network routers will not be able to transport the packet to its destination because they do not have the key and cannot see its header. By wrapping the encrypted packet inside another unencrypted packet, the packet may travel across networks like normal.

Continuing with the discussion of the scenario, upon receiving the response from the agent (which indicates a "secure" tunnel has been established and ready to use), the proxy (136) may notify (or send a response to) Client A (110A) to indicate that a "secure" tunnel has been established and ready to use, for example, to access the VM (146). Upon receiving this notification, Client A (110A) may initiate a TCP connection/socket to the TCP server (138) so that the proxy (136) may transfer/stream (TCP) data along both directions. For example, in a first direction, the proxy (136) may transfer data that is received from Client A (110A) (over the TCP socket) to the WebSocket server (137) (e.g., an edge compute endpoint (ECE) WebSocket) so that the data will be further transferred (over the tunnel (e.g., "WebSocket (WS) Connection")) to the agent (143). In a second direction, the proxy (136) may transfer second data that is received from the WebSocket server (137) (where the second data is transferred to the WebSocket server (137) from the agent (143) over the tunnel) to Client A (110A) (over the TCP socket).

Continuing with the discussion of the aforementioned example, upon receiving the data from the WebSocket server (137) over the tunnel, the agent (143) may further transfer the data to the VM (146) using a TCP socket of the VM (146), in which a connection to the VM's (146) TCP port is previously established (e.g., "connection with VM TCP port established"). Further, in an opposite direction, the agent (143) may transfer the second data that is received from the VM (146) to the WebSocket server (137) over the tunnel.

Further, once Client A's (110A) access to the VM (146) needs to be terminated (e.g., because the user of Client A (110A) just finished performing a workload on the VM (146)), Client A (110A) may send a session termination request (e.g., a disconnect request) to the proxy (136). Upon receiving the session termination request, the proxy (136) may terminate/stop operations (associated with Client A (110A)) of the WebSocket server (137), which will trigger termination of the established tunnel and the connection established (for Client A (110A)) between the agent (143) and the VM (146).

Turning now to FIG. 1.4, FIG. 1.4 shows a diagram illustrating how to manage workload balancing over the reverse connection (established in FIG. 1.3) in accordance with one or more embodiments disclosed herein. Said another way, FIG. 1.4 shows a diagram illustrating how to provide high-availability workload balancing (across a cluster (e.g., a Kubernetes cluster)) over the reverse connection.

Referring to FIG. 1.4, the management system (135) may include, for example, Client A (110A), the proxy (136) (where the proxy (136) may include/host the TCP server (138)), the WebSocket server (137), and the messaging system (139) (where the management system (135) may leverage the messaging system to send messages to an agent (e.g., 143) of a related host/IHS (e.g., 120A) that is part of a cluster (where the cluster demonstrated in FIG. 1.4 may include, at least, IHS A (120A), IHS B (120B), and IHS N (120N), and each host may have its own connection to the messaging system (139)).

Further, IHS A (120A) may include, for example, the agent (143) (where the agent (143) may include/host a TCP proxy handler (150) and a TCP proxy routine (151), which are part of the WS Client (e.g., 144, FIG. 1.2)) and the VM (146) (where the VM (146) may include the server (148) as a VM TCP server). The management system (135) and IHS A (120A) may include additional, fewer, and/or different components/computing devices without departing from the scope of the embodiments disclosed herein. Separately, each of IHS B (120B) and IHS N (120N) may include less, the same, or more components and/or services comparing to IHS A (120A).

Consider a first scenario in which a user of a TCP client (e.g., Client A (110A)) wants to have a high-availability workload balancing reverse connection to the cluster. To this end and assuming that all control planes (CPs) are available across the cluster, Client A (110A) may initiate/send a connection request ("getTCPconnection") to the proxy (136) in order to setup a connection with the TCP server (138). Said another way, the TCP client (e.g., Client A (110A)) may make an API call (e.g., the connection request, a session establishment request, etc.) to the proxy (136) with, at least, an array of a cluster node object (which indicates IHSs that need to be considered within the cluster and includes the details of each IHS). In one or more embodiments, each cluster node object may specify, for example (but not limited to): an identifier of a host (e.g., IHS A (120A)) (e.g., a unique identifier of the host that the management system (135) may use to send a message/data to the host), an identifier of a VM (e.g., the VM (146)) (e.g., a unique identifier of the VM (146) that the TCP client wants to connect to), details of a TCP port of a server that the TCP client wants to connect (e.g., at least a TCP port number of the server (148)), etc.

In response to receiving the session establishment request, the proxy (136) (or the proxy service) may send a session establishment response to Client A (110A), in which the session establishment response specifies, at least, a port number of a TCP port (e.g., "proxy-1:9091") that Client A (110A) may use to connect to the TCP server (138). Thereafter, by connecting to "proxy-1:9091", Client A (110A) may connect to the TCP server (138).

Once Client A (110A) is connected to the TCP server (138), the proxy (136) may send/write, via the messaging system (139), a message to an agent (e.g., 143) that is being executed on a first targeted host (e.g., IHS A (120A)), in a "Round Robin" fashion (e.g., unless one of the hosts is down, a first message goes to an agent of the first targeted host (represented by "CP01"), a second message goes to an agent of the second targeted host (represented by "CP02"), etc., to ensure fault tolerance and high-availability workload balancing across the cluster). In the meantime, the proxy (136) may start/boot the TCP server (138) so that the TCP server (138) may be ready to accept incoming TCP connections from Client A (110A) (e.g., TCP connections to stream/transmit TCP data from Client A (110A) to the TCP server (138)).

In the "first" scenario, upon receiving the message via its TCP proxy handler (150), the agent (143) may perform the following steps: (i) obtain the VM's (146) IP address, (ii) start, via its TCP proxy handler (150) and using the infrastructure NIC (e.g., 147, FIG. 1.2) of the VM (146), a proxy routine process (where this process may initiate a TCP connection (e.g., "TCP Dial VM<VM-IP>: <TCP-port>") to a TCP port on the VM's (146) IP address), (iii) initiate a WebSocket connection to the proxy's (136) WebSocket server (137), and (iv) in response to the message, after initiating a WebSocket connection to the WebSocket server (137), send a response to the proxy (136) to indicate that a "secure" tunnel (e.g., a secure data transfer path; a secure/encrypted, point-to-point tunnel; etc.) has been established and ready to use (additionally, when the tunnel has been established, the reverse connection (e.g., 142, FIG. 1.2) between Client A (110A) and IHS A (120A) is also established). To this end, for example, (a) data that is sent by Client A (110A) will be transferred over the tunnel to the server (148) and (b) second data that is sent by the server (148) (in response to the data sent by Client A (110A)) will be transferred over the tunnel to Client A (110A), through different hops.

Upon receiving the response from the agent (which indicates a "secure" tunnel has been established and ready to use), the proxy (136) may notify (or send a response to) Client A (110A) to indicate that a "secure" tunnel has been established and ready to use, for example, to access the VM (146). Upon receiving this notification, Client A (110A) may initiate a TCP connection/socket to the TCP server (138) so that the proxy (136) may transfer/stream (TCP) data along both directions. For example, in a first direction, the proxy (136) may transfer data that is received from Client A (110A) (over the TCP socket) to the WebSocket server (137) (e.g., an ECE WebSocket) so that the data will be further transferred (over the tunnel (e.g., "WebSocket (WS) Connection")) to the agent (143). In a second direction, the proxy (136) may transfer second data that is received from the WebSocket server (137) (where the second data is transferred to the WebSocket server (137) from the agent (143) over the tunnel) to Client A (110A) (over the TCP socket).

Continuing with the discussion of the aforementioned example, upon receiving the data from the WebSocket server (137) over the tunnel, the agent (143) may further transfer the data to the VM (146) using a TCP socket of the VM (146), in which a connection to the VM's (146) TCP port is previously established (e.g., "connection with VM TCP port established"). Further, in an opposite direction, the agent (143) may transfer the second data that is received from the VM (146) to the WebSocket server (137) over the tunnel.

Further, consider a second scenario in which the proxy (136) received a second request from the user (over Client A (110A)), in which the user wants to execute a second workload on a VM executing on the cluster. To this end, assuming that all CPs are available across the cluster, and by following the "Round Robin" fashion (to ensure fault tolerance and high-availability workload balancing across the cluster), the proxy (136) may send/write, via the messaging system (139), a message to an agent that is being executed on a second targeted host (e.g., IHS B (120B)). In the meantime, the proxy (136) may restart the TCP server (138) so that the TCP server (138) may be ready to accept incoming TCP connections from Client A (110A).

In the "second" scenario, upon receiving the message via its TCP proxy handler, the agent (of IHS B (120B)) may perform the following steps: (i) obtain an IP address of a related VM (that is being executed on IHS B (120B)), (ii) start, via its TCP proxy handler and using an infrastructure NIC of the related VM, a proxy routine process (where this process may initiate a TCP connection (e.g., "TCP Dial VM<VM-IP>: <TCP-port>") to a TCP port on the related VM's IP address), (iii) initiate a WebSocket connection to the proxy's (136) WebSocket server (137), and (iv) in response to the message, after initiating a WebSocket connection to the WebSocket server (137), send a response to the proxy (136) to indicate that a "secure" tunnel (e.g., a secure data transfer path; a secure/encrypted, point-to-point tunnel; etc.) has been established and ready to use (additionally, when the tunnel has been established, the reverse connection (e.g., 142, FIG. 1.2) between Client A (110A) and IHS B (120B) is also established). To this end, for example, (a) data that is sent by Client A (110A) will be transferred over the tunnel to the related VM and (b) second data that is sent by the related VM (in response to the data sent by Client A (110A)) will be transferred over the tunnel to Client A (110A), through different hops.

Upon receiving the response from the agent (which indicates a "secure" tunnel has been established and ready to use), the proxy (136) may notify (or send a response to) Client A (110A) to indicate that a "secure" tunnel has been established and ready to use, for example, to access the related VM (and to execute the second workload). Upon receiving this notification, Client A (110A) may initiate a TCP connection/socket to the TCP server (138) so that the proxy (136) may transfer/stream (TCP) data along both directions. For example, in a first direction, the proxy (136) may transfer data that is received from Client A (110A) (over the TCP socket) to the WebSocket server (137) (e.g., an ECE WebSocket) so that the data will be further transferred (over the tunnel (e.g., "WebSocket (WS) Connection")) to the agent (of IHS B (120B)). In a second direction, the proxy (136) may transfer second data that is received from the WebSocket server (137) (where the second data is transferred to the WebSocket server (137) from the agent over the tunnel) to Client A (110A) (over the TCP socket).

Continuing with the discussion of the aforementioned example, upon receiving the data from the WebSocket server (137) over the tunnel, the agent (of IHS B (120B)) may further transfer the data to the related VM using a TCP socket of the related VM, in which a connection to the related VM's TCP port is previously established. Further, in an opposite direction, the agent (of IHS B (120B)) may transfer the second data that is received from the related VM to the WebSocket server (137) over the tunnel.

As indicated above, in the second scenario, the workload will be balanced among available CPs (or IHSs) in accordance with the "Round Robin" fashion (e.g., the third request (received from the user via Client A (110A)) will be directed to a third targeted host/node in the cluster).

Further, consider a third scenario in which (a) the proxy (136) received another request (e.g., a fourth request) from the user (over Client A (110A)) where the user wants to execute a third workload on a VM executing on the cluster and (b) IHS A (120A) (or the CP01) is now down (the proxy (136) may infer IHS A (120A) is down via the messaging system (139), where the messaging system (139) may infer IHS A (120A) is down after not receiving a response from the TCP proxy handler (150) to its message). In one or more embodiments, IHS A (120A) may be down because, for example (but not limited to): IHS A is experiencing a hardware component related failure, IHS A is currently performing an application upgrade, IHS A does not have available computing resources to execute any additional workload (in this case, the TCP proxy handler (150) may notify the messaging system (139) to indicate that IHS A does not have available computing resources to execute the third workload), etc.

To this end and by following the "Round Robin" fashion (to ensure fault tolerance and high-availability workload balancing across the cluster), the proxy (136) may send/write, via the messaging system (139), a message to an agent that is being executed on the second targeted host (e.g., IHS B (120B)). In the meantime, the proxy (136) may restart the TCP server (138) so that the TCP server (138) may be ready to accept incoming TCP connections from Client A (110A).

In the "third" scenario, upon receiving the message via its TCP proxy handler, the agent (of IHS B (120B)) may perform the following steps: (i) obtain an IP address of a related VM (that is being executed on IHS B (120B)), (ii) start, via its TCP proxy handler and using an infrastructure NIC of the related VM, a proxy routine process (where this process may initiate a TCP connection (e.g., "TCP Dial VM<VM-IP>: <TCP-port>") to a TCP port on the related VM's IP address), (iii) initiate a WebSocket connection to the proxy's (136) WebSocket server (137), and (iv) in response to the message, after initiating a WebSocket connection to the WebSocket server (137), send a response to the proxy (136) to indicate that a "secure" tunnel (e.g., a secure data transfer path; a secure/encrypted, point-to-point tunnel; etc.) has been established and ready to use (additionally, when the tunnel has been established, the reverse connection (e.g., 142, FIG. 1.2) between Client A (110A) and IHS B (120B) is also established). To this end, for example, (a) data that is sent by Client A (110A) will be transferred over the tunnel to the related VM and (b) second data that is sent by the related VM (in response to the data sent by Client A (110A)) will be transferred over the tunnel to Client A (110A), through different hops.

Upon receiving the response from the agent (which indicates a "secure" tunnel has been established and ready to use), the proxy (136) may notify (or send a response to) Client A (110A) to indicate that a "secure" tunnel has been established and ready to use, for example, to access the related VM (and to execute the third workload). Upon receiving this notification, Client A (110A) may initiate a TCP connection/socket to the TCP server (138) so that the proxy (136) may transfer/stream (TCP) data along both directions. For example, in a first direction, the proxy (136) may transfer data that is received from Client A (110A) (over the TCP socket) to the WebSocket server (137) (e.g., an ECE WebSocket) so that the data will be further transferred (over the tunnel (e.g., "WebSocket (WS) Connection")) to the agent (of IHS B (120B)). In a second direction, the proxy (136) may transfer second data that is received from the WebSocket server (137) (where the second data is transferred to the WebSocket server (137) from the agent over the tunnel) to Client A (110A) (over the TCP socket).

Continuing with the discussion of the aforementioned example, upon receiving the data from the WebSocket server (137) over the tunnel, the agent (of IHS B (120B)) may further transfer the data to the related VM using a TCP socket of the related VM, in which a connection to the related VM's TCP port is previously established. Further, in an opposite direction, the agent (of IHS B (120B)) may transfer the second data that is received from the related VM to the WebSocket server (137) over the tunnel.

Further, once Client A's (110A) access to the related VM needs to be terminated (e.g., because the user of Client A (110A) just finished performing the third workload on the related VM), Client A (110A) may send a session termination request (e.g., a disconnect request) to the proxy (136). Upon receiving the session termination request, the proxy (136) may terminate/stop operations (associated with Client A (110A)) of the WebSocket server (137), which will trigger termination of the established tunnel and the connection established (for Client A (110A)) between the agent (of IHS B (120B)) and the related VM.

As indicated above, in the third scenario, the workload will be balanced among available CPs (or IHSs) in accordance with the "Round Robin" fashion, in which, when an IHS (or a CP of the IHS) is down, the proxy (136) will communicate with the next available IHS in the cluster (to satisfy the user's requests and to ensure workload balancing and high-availability access to the cluster).

Further, referring to FIG. 1.4 and in case the cluster is a Kubernetes cluster, Client A (110A) may need to authenticate a corresponding server (e.g., 148) via a certificate (for security purposes). Client A (110A) may need to perform the authentication because Client A (110A) may need to communicate with the corresponding server via the proxy (136), not directly.

FIGS. 2.1-2.4 show a method for managing high-availability workload balancing (across a cluster of IHSs) over a reverse connection in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2.1, the method shown in FIG. 2.1 may be executed by, for example, the above-discussed components of the management system (e.g., 135, FIG. 1.3). Other components of the system (100) illustrated in FIG. 1.1 may also execute all or part of the method shown in FIG. 2.1 without departing from the scope of the embodiments disclosed herein.

In Step 200, a client (e.g., 110A, FIG. 1.4) receives an access request from a requesting entity (e.g., from a user, from a user terminal, etc.) that wants to access the cluster of IHSs to initiate performing a workload (e.g., on a VM executing on one of the IHSs). In one or more embodiments, the client may be part of an external network (or an external environment) (e.g., 140, FIG. 1.2). Separately, the cluster may be part of an internal network (or an internal environment) (e.g., 145, FIG. 1.2).

In Step 202, in response to receiving the request, as part of that request, and/or in any other manner (e.g., before initiating any computation with respect to the request), the client sends/initiates a connection request to a proxy (e.g., 136, FIG. 1.4) in order to setup a connection with a TCP server (e.g., 138, FIG. 1.4). Said another way, the "TCP" client makes/sends an API call (e.g., the connection request, a session establishment request, etc.) to the proxy in order to setup a connection with the TCP server. Details of the connection request are described above in reference to FIG. 1.4.

In response to receiving the session establishment request, the proxy (or the proxy service) may send a session establishment response to the client. Thereafter, by connecting to a related TCP port, the client may connect to the TCP server.

Details of the session establishment response are described above in reference to FIG. 1.4.

In Step 204, upon receiving the API call and once the client is connected to the TCP server, the proxy sends/writes, via a messaging system (e.g., 139, FIG. 1.4), a message to an agent (e.g., 143, FIG. 1.4) that is being executed on a first targeted IHS (e.g., 120A, FIG. 1.4) of the cluster, in a "Round Robin" fashion (to ensure fault tolerance and high-availability workload balancing across the cluster).

In Step 206, upon receiving the API call (or in the meantime while performing Step 204), the proxy starts/initiates the TCP server so that the TCP server will be ready to accept incoming TCP connections from the client (e.g., TCP connections to stream/transmit TCP data from the client to the TCP server).

In Step 208, based on the message sent (in Step 204) to the agent of the first targeted IHS, the proxy makes a determination (in real-time or near real-time) as to whether the first targeted IHS is down. Accordingly, in one or more embodiments, if the result of the determination is NO, the method proceeds to Step 210. If the result of the determination is YES, the method alternatively proceeds to Step 216.

In one or more embodiments, the proxy may infer the first targeted IHS is down via the messaging system, in which the messaging system may infer the first targeted IHS is down after not receiving a response from a TCP proxy handler (of the first targeted IHS) to its message.

In Step 210, as a result of the determination in Step 208 being NO and in response to the message (sent to the agent), the proxy receives a response (indicating that a "secure" tunnel has been established and ready to use) from the agent. In one or more embodiments, when the tunnel has been established, the reverse connection between the client and the first targeted IHS is also established. In Step 212, upon receiving the response from the agent and in response to the request (received in Step 200), the proxy notifies (or sends a second response to) the client to indicate that a "secure" tunnel has been established and ready to use, for example, to access a VM (e.g., 146, FIG. 1.4) executing on the first targeted IHS and to perform the workload on the VM. In Step 214, upon receiving the second response (or the notification), the client initiates a TCP connection/socket to the TCP server so that the proxy may transfer/stream data along both directions. Details of the directions are described above in reference to FIG. 1.4.

In Step 216, as a result of the determination in Step 208 being YES and by following the "Round Robin" fashion, the proxy sends, via the messaging system, a message to a second agent that is being executed on another "healthy" IHS (e.g., a second targeted IHS (e.g., 120B, FIG. 1.4)) in the cluster. In Step 218, in response to the message (sent to the second agent), the proxy receives a response (indicating that a "secure" tunnel has been established and ready to use) from the second agent.

In Step 220, upon receiving the response from the second agent and in response to the request (received in Step 200), the proxy notifies (or sends a second response to) the client to indicate that a "secure" tunnel has been established and ready to use, for example, to access a VM executing on the second targeted IHS and to perform the workload on the VM.

Turning now to FIG. 2.2, the method shown in FIG. 2.2 may be executed by, for example, the above-discussed components of the management system. Other components of the system (100) illustrated in FIG. 1.1 may also execute all or part of the method shown in FIG. 2.2 without departing from the scope of the embodiments disclosed herein.

In Step 222, the proxy receives, via/over the TCP connection, data associated with the workload from the client. In Step 224, the proxy then transfers the data to a WebSocket (e.g., an ECE WS) of a WebSocket server (e.g., 137, FIG. 1.4). In Step 226, the proxy, via the WebSocket server, transfers the data to the agent (of the first targeted IHS) over the tunnel (e.g., over the reverse connection). Thereafter, upon receiving the data from the WebSocket server over the tunnel, the agent may further transfer the data to the VM (of the first targeted IHS) using a TCP socket of the VM, in which the VM may initiate performing the workload. The agent may then notify, over the tunnel, the proxy to indicate that performing of the workload is started.

In Step 228, the proxy initiates notification of the user, via a GUI of the client, to indicate that performing of the workload is started. In one or more embodiments, the method may end following Step 228.

Turning now to FIG. 2.3, the method shown in FIG. 2.3 may be executed by, for example, the above-discussed components of the management system. Other components of the system (100) illustrated in FIG. 1.1 may also execute all or part of the method shown in FIG. 2.3 without departing from the scope of the embodiments disclosed herein.

In Step 230, upon receiving the second response (or the notification), the client initiates a TCP connection/socket to the TCP server so that the proxy may transfer/stream data along both directions. Details of the directions are described above in reference to FIG. 1.4.

In Step 232, the proxy receives, via/over the TCP connection, data associated with the workload from the client. In Step 234, the proxy then transfers the data to a WebSocket (e.g., an ECE WS) of the WebSocket server. In Step 236, the proxy, via the WebSocket server, transfers the data to the second agent (of the second targeted IHS) over the tunnel (e.g., over the reverse connection). Thereafter, upon receiving the data from the WebSocket server over the tunnel, the second agent may further transfer the data to the VM (of the second targeted IHS) using a TCP socket of the VM, in which the VM may initiate performing the workload. The second agent may then notify, over the tunnel, the proxy to indicate that performing of the workload is started.

In Step 238, the proxy initiates notification of the user, via a GUI of the client, to indicate that performing of the workload is started. In one or more embodiments, the method may end following Step 238.

Turning now to FIG. 2.4, the method shown in FIG. 2.4 may be executed by, for example, the above-discussed agent. Other components of the system (100) illustrated in FIG. 1.1 may also execute all or part of the method shown in FIG. 2.4 without departing from the scope of the embodiments disclosed herein.

In Step 240, upon receiving the message (in Step 204 of FIG. 2.1) via its TCP proxy handler (e.g., 150, FIG. 1.4), the agent obtains an IP address of the first targeted IHS' VM. In Step 242, the agent starts, via its TCP proxy handler and using an infrastructure NIC (e.g., 147, FIG. 1.2) of the VM (and the VM's IP address), a proxy routine process to initiate/open a TCP connection/socket to a TCP port on the VM's IP address. In Step 244, using the TCP socket, the agent initiates a WebSocket connection to the proxy's WebSocket server. In Step 246, in response to the message (received in Step 204 of FIG. 2.1) and after initiating a WebSocket connection to the WebSocket server, the agent sends a response to the proxy to indicate that the "secure"

tunnel has been established and ready to use. In one or more embodiments, the method may end following Step 246.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing workload balancing over a reverse connection, the method comprising:
receiving, via a client, an access request from a user that wants to access a cluster of information handling systems (IHSs) to initiate performing a workload,
wherein an external environment comprises at least the client,
wherein an internal environment comprises at least the cluster;
sending, upon receiving the request, an application programming interface (API) call to a proxy service;
upon receiving the API call:
sending a message to an agent executing on a first targeted IHS in the cluster;
initiating a transmission control protocol (TCP) server hosted by the proxy service;
making, after initiating the TCP server, a determination that the first targeted IHS is not down;
receiving, based on the determination and in response to the message, a response from the agent indicating that a tunnel has been established,
wherein, when the tunnel has been established, the reverse connection between the client and the first targeted IHS is established;
after receiving the response from the agent, sending, a second response to the client to indicate that the tunnel is ready to use;
initiating, upon receiving the second response, a TCP connection to the TCP server;
receiving, via the TCP connection, data associated with the workload from the client;
transferring the data to the agent over the reverse connection; and
initiating, after the transferring starts, a notification of the user to indicate that performing of the workload is started.

2. The method of claim 1, wherein the API call specifies at least one selected from a group consisting of an identifier of the first targeted IHS, an identifier of a virtual machine (VM) that is hosted by the first targeted IHS and the user wants to access to perform the workload, and a TCP port number of the VM.

3. The method of claim 2,
wherein, upon receiving the message, the agent obtains an Internet Protocol (IP) address of the VM,
wherein, using the IP address of the VM, the agent starts a proxy routine to open a TCP socket to a TCP port on the IP address,
wherein, using the TCP socket, the agent initiates a socket connection to the proxy service's socket server, and
wherein, in response to the message, the agent sends the response to the proxy service to indicate that the tunnel has been established.

4. The method of claim 3, wherein the tunnel is established using the socket connection.

5. The method of claim 1, wherein the external environment is a public environment representing a public network.

6. The method of claim 1, wherein the internal environment is a private environment representing a private network that is behind a firewall.

7. The method of claim 1, wherein the reverse connection is a reverse TCP connection.

8. A method for managing workload balancing over a reverse connection, the method comprising:
receiving, via a client, an access request from a user that wants to access a cluster of information handling systems (IHSs) to initiate performing a workload,
wherein an external environment comprises at least the client, wherein an internal environment comprises at least the cluster;

sending, upon receiving the request, an application programming interface (API) call to a proxy service;

upon receiving the API call:
- sending a message to an agent executing on a first targeted IHS in the cluster; and
- initiating a transmission control protocol (TCP) server hosted by the proxy service;

making, after initiating the TCP server, a determination that the first targeted IHS is down;

sending, based on the determination, the message to a second agent executing on a second targeted IHS in the cluster, wherein the second targeted IHS is not down;

receiving, in response to the message, a response from the second agent indicating that a tunnel has been established,
- wherein, when the tunnel has been established, the reverse connection between the client and the second targeted IHS is established;

after receiving the response from the agent, sending a second response to the client to indicate that the tunnel is ready to use;

initiating, upon receiving the second response, a TCP connection to the TCP server;

receiving, via the TCP connection, data associated with the workload from the client;

transferring the data to the second agent over the reverse connection; and initiating, after the transferring starts, a notification of the user to indicate that performing of the workload is started.

9. The method of claim 8, wherein the first targeted IHS is down because the first targeted IHS does not have available computing resources in order to perform the workload.

10. The method of claim 8, wherein, when a second access request is received after the access request, a second message that is associated with the second access request is directly sent to the second agent, not to the agent.

11. The method of claim 8, wherein the API call specifies at least one selected from a group consisting of an identifier of the second targeted IHS, an identifier of a virtual machine (VM) that is hosted by the second targeted IHS and the user wants to access to perform the workload, and a TCP port number of the VM.

12. The method of claim 11,
- wherein, upon receiving the message, the second agent obtains an Internet Protocol (IP) address of the VM,
- wherein, using the IP address of the VM, the second agent starts a proxy routine to open a TCP socket to a TCP port on the IP address,
- wherein, using the TCP socket, the second agent initiates a socket connection to the proxy service's socket server, and
- wherein, in response to the message, the second agent sends the response to the proxy service to indicate that the tunnel has been established.

13. The method of claim 12, wherein the tunnel is established using the socket connection.

14. The method of claim 8, wherein the external environment is a public environment representing a public network.

15. The method of claim 8, wherein the internal environment is a private environment representing a private network that is behind a firewall.

16. A system for managing workload balancing over a reverse connection, the system comprising:
- a cluster of information handling systems (IHSs); and
- a management system, wherein the management system is programmed to:
  - receive, via a client, an access request from a user that wants to access the cluster to initiate performing a workload,
    - wherein an external environment comprises at least the client,
    - wherein an internal environment comprises at least the cluster;
  - send, upon receiving the request, an application programming interface (API) call to a proxy service;
  - upon receiving the API call:
    - send a message to an agent executing on a first targeted IHS in the cluster; and
    - initiate a transmission control protocol (TCP) server hosted by the proxy service;
  - make, after initiating the TCP server, a determination that the first targeted IHS is down;
  - send, based on the determination, the message to a second agent executing on a second targeted IHS in the cluster, wherein the second targeted IHS is not down;
  - receive, in response to the message, a response from the second agent indicating that a tunnel has been established,
    - wherein, when the tunnel has been established, the reverse connection between the client and the second targeted IHS is established;
  - after receiving the response from the agent, send a second response to the client to indicate that the tunnel is ready to use;
  - initiate, upon receiving the second response, a TCP connection to the TCP server;
  - receive, via the TCP connection, data associated with the workload from the client;
  - transfer the data to the second agent over the reverse connection; and
  - initiate, after the transferring starts, a notification of the user to indicate that performing of the workload is started.

17. The system of claim 16, wherein, when a second access request is received after the access request, a second message that is associated with the second access request is directly sent to the second agent, not to the agent.

18. The system of claim 16, wherein the API call specifies at least one selected from a group consisting of an identifier of the second targeted IHS, an identifier of a virtual machine (VM) that is hosted by the second targeted IHS and the user wants to access to perform the workload, and a TCP port number of the VM.

19. The system of claim 18,
- wherein, upon receiving the message, the second agent obtains an Internet Protocol (IP) address of the VM,
- wherein, using the IP address of the VM, the second agent starts a proxy routine to open a TCP socket to a TCP port on the IP address,
- wherein, using the TCP socket, the second agent initiates a socket connection to the proxy service's socket server, and
- wherein, in response to the message, the second agent sends the response to the proxy service to indicate that the tunnel has been established.

20. The system of claim 16,
wherein the external environment is a public environment representing a public network, and
wherein the internal environment is a private environment representing a private network that is behind a firewall.

* * * * *